P. FERGUSON.
CANE OR CORN TOPPER OR HEADER.
APPLICATION FILED MAR. 1, 1913.
1,265,710.
Patented May 7, 1918.
4 SHEETS—SHEET 1.
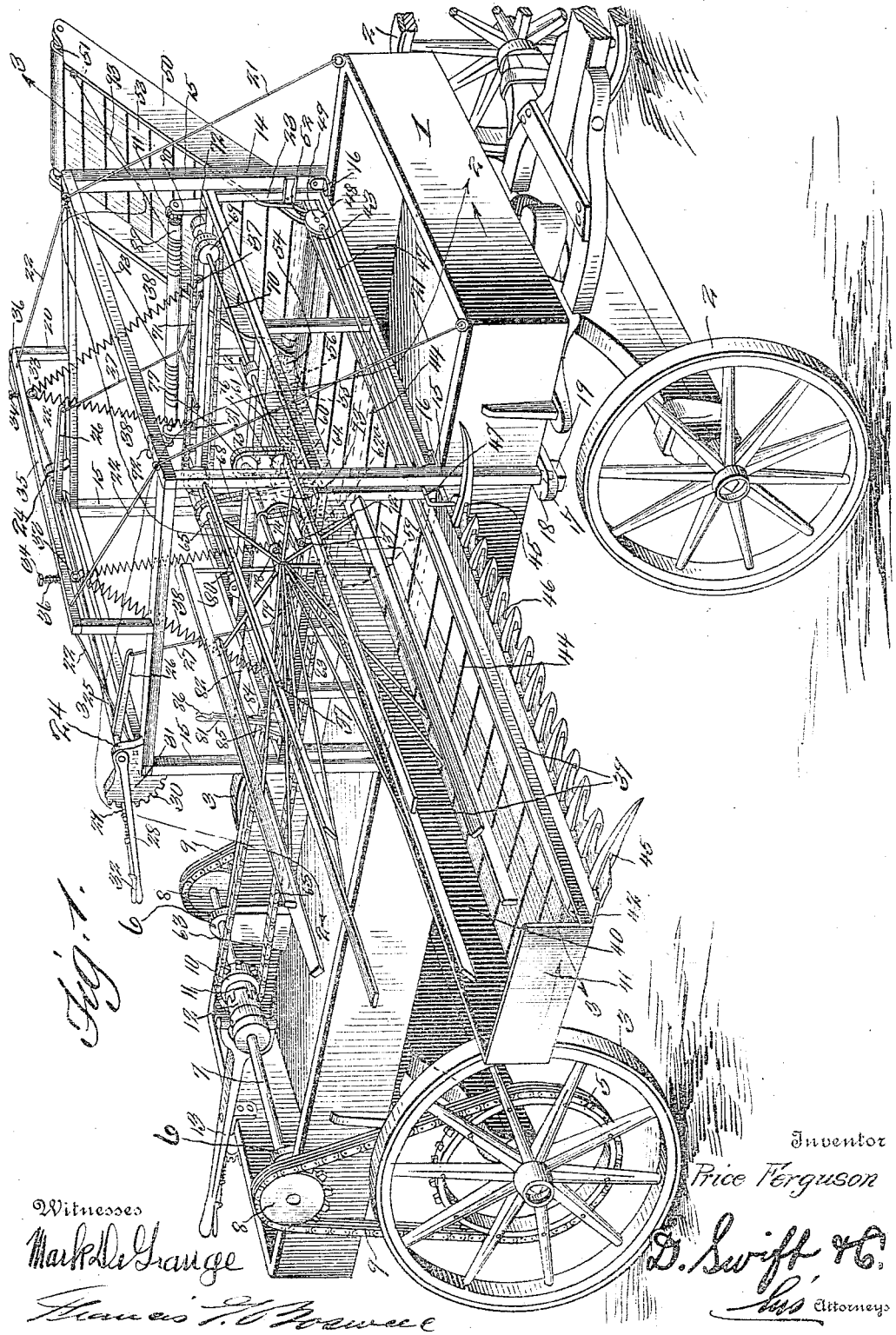

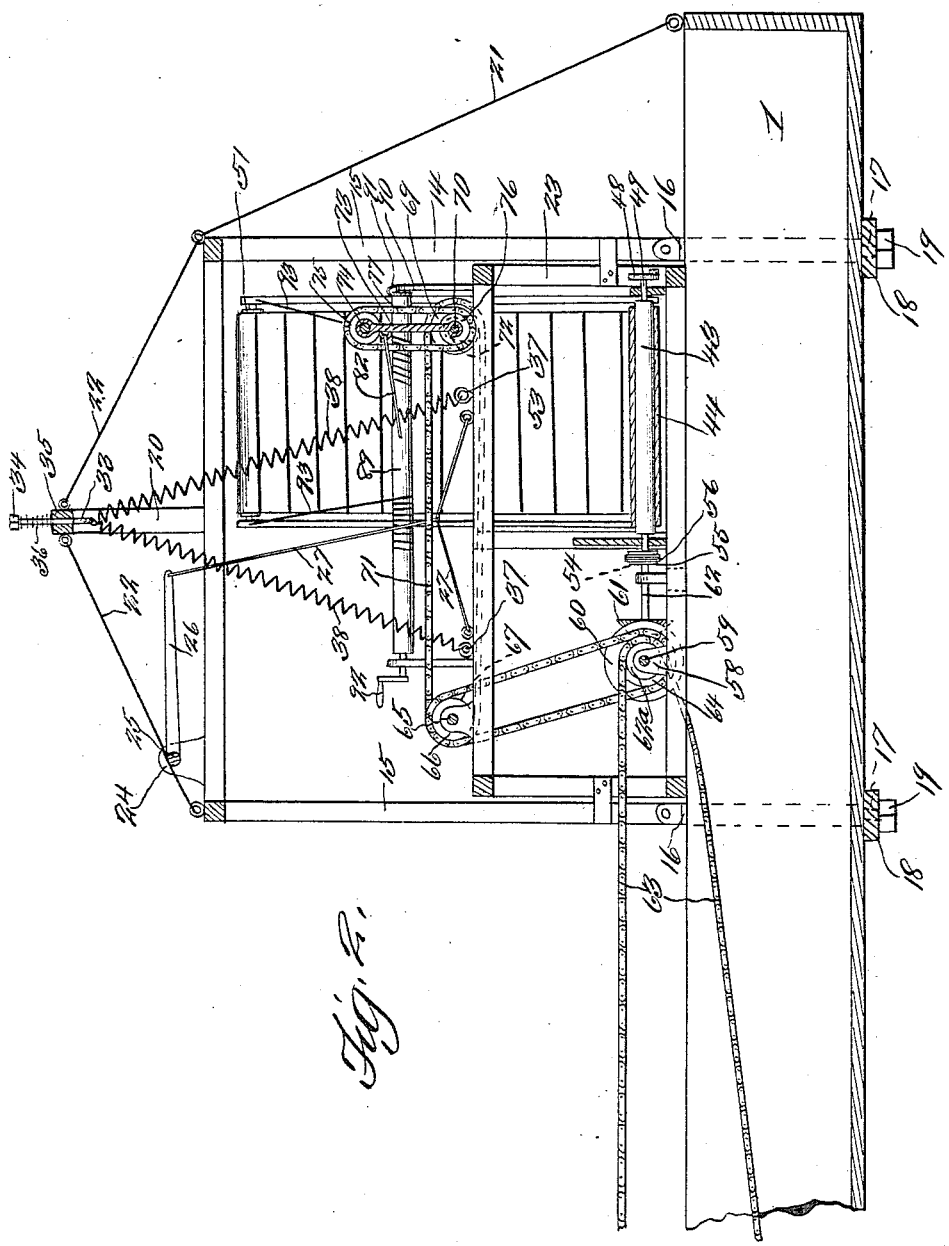

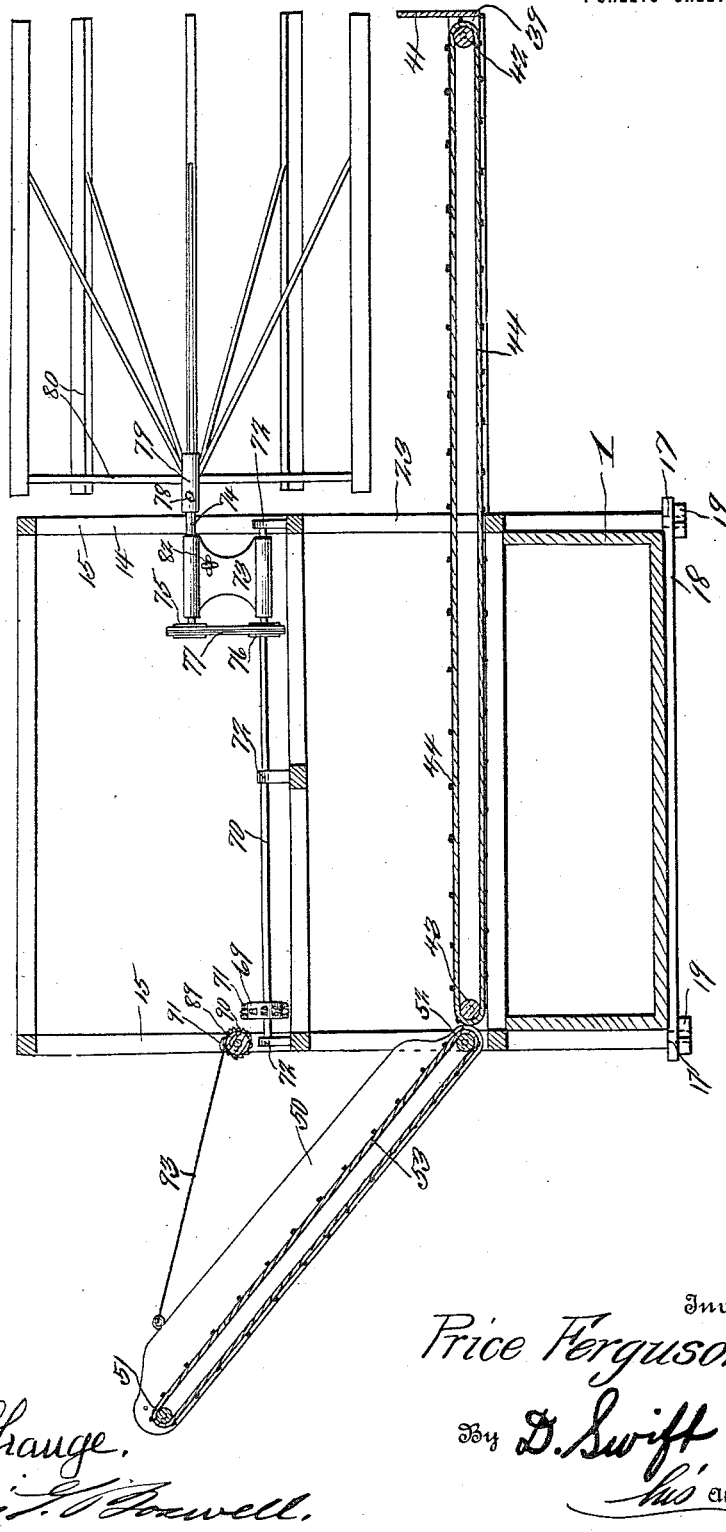

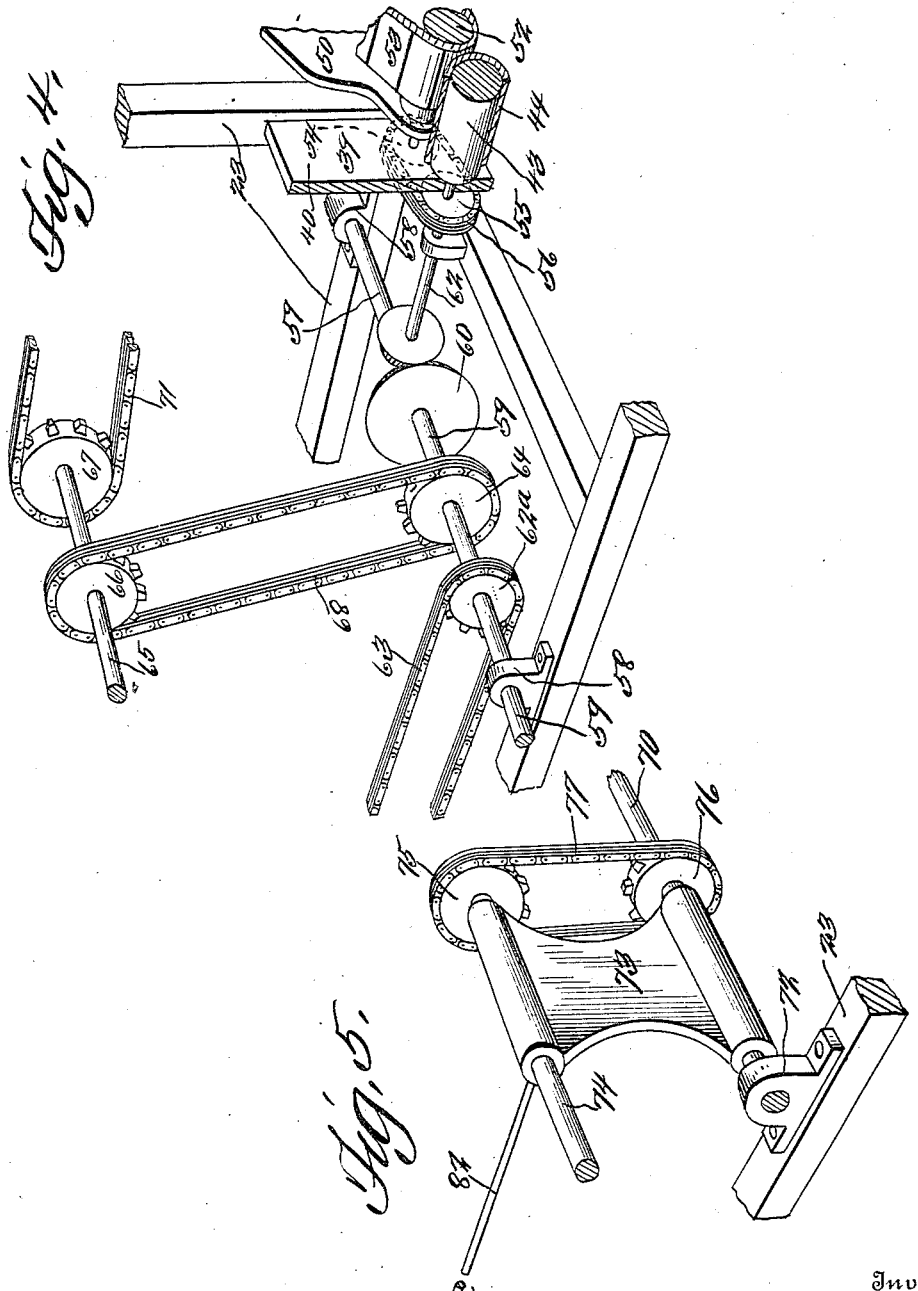

# UNITED STATES PATENT OFFICE.

PRICE FERGUSON, OF TUTTLE, OKLAHOMA, ASSIGNOR TO MARK FERGUSON, OF BLANCHARD, OKLAHOMA.

CANE OR CORN TOPPER OR HEADER.

1,265,710.

Specification of Letters Patent.

Patented May 7, 1918.

Application filed March 1, 1913. Serial No. 751,501.

*To all whom it may concern:*

Be it known that I, PRICE FERGUSON, a citizen of the United States, residing at Tuttle, in the county of Grady and State of Oklahoma, have invented a new and useful Cane or Corn Topper or Header; and I do hereby declare the following to be a full, clear, and exact description of the invention, such as will enable others skilled in the art to which it appertains to make and use the same.

This invention relates to cane and corn toppers or headers.

An object of the invention is to provide a mechanism supporting and guiding frame to be carried by and braced relative to and upon a wagon body, in which frame a supplemental frame is vertically movable and adjustable.

Another object of the invention is the provision of a mechanism for adjusting the supplemental frame.

Another object of the invention is to provide cutting mechanism, carried by the supplemental frame and operated by suitable mechanisms having connections with the rear wheels of the wagon, for severing the tops of the cane or corn.

Another object of the invention is to provide an adjustable cutting mechanism and conveyers, and to adjust one of the conveyers independent of the cutter and one of the conveyer mechanisms.

One of the features of the invention is the provision of a conveyer belt on which the tops of the cane or corn fall, in order to be conveyed to one side of the machine, where the tops are elevated by a second conveyer and deposited into a suitable receptacle or the like, for instance such as a wagon adapted to be driven alongside of the machine.

Another feature of the invention is the provision of a reel for knocking the tops of the cane or corn upon the first conveyer belt.

The invention, as hereinafter to be set forth, is shown in simple form in the drawings, whereon—

Figure 1 is a view in perspective, showing the improved cane or corn topper or header constructed in accordance with the invention, and applied to a wagon body.

Fig. 2 is a sectional view on line 2—2 of Fig. 1.

Fig. 3 is a sectional view on line 3—3 of Fig. 1.

Fig. 4 is an enlarged detail view of a portion of the machine.

Fig. 5 is a detail view of the casting frame, and the lever for adjusting the same.

In these views similar characters of reference indicate similar parts.

Referring to the drawings, 1 designates the usual form of wagon body, having the front wheels 2. The rear of the body is mounted upon the usual rear wheels 3. Rotating with the rear wheels are sprockets 5, only one being shown. Mounted in bearings 6 of the wagon body is a drive shaft 7 having sprocket wheels 8. Passed about each of the sprocket wheels 8 is a sprocket chain 9. Each of the sprocket chains 9 passes about the corresponding sprocket 5, only one chain 9 being shown as actually engaging one of the sprockets 5, but it is perfectly evident from the manner in which the other chain is illustrated, that the same is designed to pass about a sprocket wheel similar to the one shown in the foreground of the drawing.

Also loosely mounted upon the shaft 7 is a sprocket 10, the purpose of which will hereinafter appear. The sprocket wheel 10 is provided with a clutch member 11, with which the clutch device 12 (which is keyed upon the shaft 7) coöperates. A lever 13 having connections with the clutch device 12, is adapted for throwing the same in coöperation with the clutch member of the sprocket 10, whereby the said sprocket may be made to rotate with the shaft 7.

A frame 14 is provided, the corner posts 15 of which are provided with offset plates 16 to engage the upper edges of the sides of the wagon body, while the lower extremities of the posts 14 terminate in threaded extensions 17 passing through the bars 18 there being nuts or the like 19 connected or threaded to the extensions, thereby firmly clamping the frame in position. This frame is provided with an extension arch 20, which is braced relative to the frame 15 (which in turn is braced by the rods 21 with regard to the wagon body) by means of the rods 22. The frame 15 is in turn braced with regard to the wagon body by the rods 21.

The frame 14 guides a supplemental frame 23, when adjusted to various positions. Mounted in bearings 24 of the frame 14 is a rock shaft or rod 25 having arms 26, which in turn are connected to the supplemental frame by the links 27.

To hold the supplemental frame in adjusted positions, a lever 28 is fixed to the rock shaft 25, and provided with a suitable dog 29 to engage the teeth 30 of the rack 31. In this manner the supplemental frame may be raised and lowered by the lever 28, and held in adjusted positions by the dog 29, there being a hand grip 32 for operating the dog.

Passing through the extension arch are two eye bolts 33, between the adjustable nuts 34 of which bolts, and the bar 35 of the extension arch, are springs 36, which are compressed when the eye bolts are pulled downwardly slightly by the weight of the supplemental frame. Connecting between the eye bolts and the supplemental frame, as at 37, are coil springs 38, which act to relieve the operator when manipulating the lever 28, of the dead weight of the supplemental frame. When the suplemental frame is lowered these springs 38, as well as the springs 36, tend to cushion the supplemental frame.

The supplemental frame is constructed with a lateral extension frame 29 having a fender 40, which includes an end piece 41.

Mounted in bearings of any suitable construction at the end of the lateral extension frame is a roller or drum 42, while in suitable bearings of the supplemental frame is a roller 43. Passing about the rollers 42 and 43 is a conveyer belt 44. Guided in bearings 45 of one side of the lateral extension frame is a mower sickle bar 46, to which a pitman 47 is connected, which in turn is connected eccentrically to a disk 48, which is mounted on the spindle 49 of the roller 43, and movable therewith. Extending laterally and upwardly from the other side of the frame 14 is a second extension frame 50, in the upper end of which a roller 51 is mounted, over which and about the roller 52 (which is mounted in bearings of the frame 14) is a conveyer belt 53. The two rollers 43 and 52 are geared together by the sprocket wheels 54 and 55, and the chain 56. As the cane or corn tops are thrown upon the conveyer belt 44, they are conveyed laterally, and then upwardly by the belt 53, and then into a second wagon, running alongside of the wagon carrying the machine.

Mounted in bearings 58 of the supplemental frame is a shaft 59 having a beveled gear 60, which meshes with a beveled gear 61 of the extension 62 of the roller 43. In this manner the two conveyer belts are operated, owing to the fact that the sprocket wheel 62ª of the shaft 59 is geared to the sprocket wheel 10 of the drive shaft 7, by means of the chain 63.

A sprocket wheel 64 is mounted upon and movable with the shaft 59. Mounted in bearings of the supplemental frame is a shaft 65 having sprockets 66 and 67. The sprocket 66 is geared to the sprocket 64 by the chain 68, while the sprocket 67 is geared to a sprocket 69 of a shaft 70, by means of a chain 71. The shaft 70 is mounted in bearings 72, and has an oscillatory casting or frame 73, in a bearing of which a shaft 74 is mounted. The shaft 74 has a sprocket 75 geared to the sprocket 76 of the shaft 70, by means of the chain 77. Fixed to an extension of the shaft 74 by means of the pins 78 and the sleeve 79 is a reel 80, which acts to knock or throw the corn or cane tops upon the conveyer 44. The reel is rotated, owing to the gear connections between the shaft 74 and the shaft 70, which has gear connections with the shaft 59, which in turn is operated by the chain 63 which passes about the sprocket 10. The reel may be adjusted in different positions, owing to the fact that the casting of frame 73 may be oscillated, by virtue of the lever 81, which has a rod connection 82 with the casting of frame 73, which lever 81 may be held in adjusted positions by means of the dog 84 engaging the teeth of the rack 85. The dog 84 may be manipulated by the hand grip 86. The second extension frame which supports the conveyer belt 53 may be tilted upwardly or downwardly as desired, by operating the drum 89, which is held in adjusted positions by the ratchet and pawl device 90 and 91, by means of the handle 92. Two ropes or cables 93 are wound about the drum 89 and are connected to the second lateral extension frame. Thus the second conveyer is adjustable and independent of the first conveyer and cutters.

It is to be ascertained from the foregoing that there has been devised a simple and efficient machine for heading or topping Kafir corn or cane, and one which has been found desirable and practicable.

Having thus described this invention I claim:

1. In a machine as set forth, a wagon, a drive shaft, connections between the rear wheels of the wagon and said drive shaft, a main frame detachably supported on the wagon, a supplemental frame vertically adjustable and guided in the main frame, said supplemental frame having laterally operable conveyer belts at the rear of a topping mechanism, a cane topping severing mechanism carried by the supplemental frame, a reel device for throwing the tops on one of the conveyer belts, gear connections between said belts, the severing mechanism and the reel, and said drive shaft for operating said mechanisms simultaneously, means for adjusting the reel, cutters and conveyers together within the frame, means for independently adjusting one of the conveyers, means for adjusting the reel, and means to throw the mechanism in and out of engagement with the driving shaft.

2. In a machine as set forth, a wagon, a drive shaft, connections between the driving shaft and the rear wheels, a main frame detachably supported on the wagon, a supplemental frame vertically adjustable and guided in the main frame, said supplemental frame having laterally operable conveyer belts at the rear of a topping device, a cane topping severing mechanism carried by said supplemental frame, a reel device for throwing the tops on one of the conveyer belts, gear connections between said belts, the severing mechanism and the reel and said drive shaft for operating said mechanisms simultaneously, means for adjusting the supplemental frame and holding the same in adjusted positions, and means for independently adjusting the inclination of an inclined conveyer adjustable with the supplemental frame.

3. In a machine as set forth, a wagon, a drive shaft having connections with the rear wheels thereof, a main frame detachably supported on the wagon body, a supplemental frame vertically movable and guided in the main frame, said supplemental frame having laterally operable conveyer belts at the rear of a cutting mechanism, and provided with a cane topping severing mechanism, a reel device for throwing the tops on one of the conveyer belts, and carried by the supplemental frame, gear connections between said belts, the severing mechanism and the reel and said shaft for operating said mechanism simultaneously, means for shifting the reel device to different positions, means to independently adjust the inclination of one of the conveyers in any of its adjusted positions, and a clutch for throwing in the power from the drive shaft.

4. In a machine as set forth, a wagon, a drive shaft having connections with the rear wheels thereof, a main frame, detachably supported on the wagon body, a supplemental frame vertically movable and guided in the main frame, said supplemental frame having laterally operable and adjustable conveyer belts at the rear of a topping device and provided with an adjustable cane topping severing mechanism, an adjustable reel device for throwing the tops on one of the conveyer belts, said belts the severing mechanism and the reel having gear connections with the said drive shaft for operating said mechanism simultaneously, means for adjusting the reel device to different positions, said main frame having an extension arch, yielding means connecting the arch and the supplemental frame, means for adjusting the topper and conveyer together and a conveyer independently a fender carried by the supplemental frame, and a clutch for said drive shaft.

5. In a machine as set forth, a wagon, a drive shaft having connections with the rear wheels thereof, a main frame detachably supported on the wagon body, a supplemental frame vertically movable and guided in the main frame, said supplemental frame having laterally operable conveyer belts and provided with an adjustable cane topping severing mechanism, a reel device for throwing the tops of one of the conveyer belts, said belts, the severing mechanism and the reel having connections with the drive shaft for operating said mechanisms simultaneously and means for shifting the reel device to different positions, said main frame having an extension arch, and yieldable means connecting the arch and the supplemental frame, means for raising and lowering the supplemental frame, and holding the same in adjusted positions, a clutch in said driving shaft, and a fender surrounding the conveyer.

6. In a machine as set forth, a wagon, a main frame rising from the wagon, a supplemental frame adapted to be raised and lowered vertically in the main frame, and provided with a cutting mechanism and a conveyer mechanism, a drive shaft mounted in bearings of the supplemental frame, a plate pivoted on the drive shaft, a reel having an adjustable reel shaft mounted in a bearing of the free end of said plate, connections between the reel shaft and the driven shaft, means carried by the supplemental frame and connected to the plate for oscillating the same, whereby the reel may be thrown forwardly and rearwardly an extended adjustable conveyer, a fender for the conveyer and cutters carried by the supplemental frame.

7. In a machine as set forth, the combination with a wagon having a body, of a main frame rising vertically from the body, a supplemental frame adapted to be adjusted vertically in the main frame, a cutting mechanism carried by the supplmental frame, a conveying mechanism carried by said supplemental frame, a driven shaft mounted in said bearings of the supplemental frame a plate having a sleeve at its lower end receiving the driven shaft to act as a pivot for the plate, said plate having a sleeve at its upper end, a reel shaft mounted in said sleeve at the end of said plate, and provided with a reel, connections between the reel shaft and the driven shaft, a rod connected to the frame portion of said plate, means carried by the supplemental frame for reciprocating said rod to oscillate the plate whereby the reel may be adjusted forwardly and rearwardly, while owing to the vertical adjustment of the supplemental frame the reel is moved vertically with the supplemental frame, and a laterally extended conveyer adjustable independent of the main shaft.

8. In a machine as set forth, the combination with a wagon having a body and provided with front and rear wheels, of a skeleton rectangular main frame rising vertically from the body, said main shaft having a transverse member, a supplemental frame adapted to be adjusted vertically and guided in the main frame, means for adjusting the supplemental frame, devices connecting the transverse members of the main frame and the supplemental frame to relieve the dead weight of the supplemental frame upon the adjusting means thereof, a cutting mechanism carried by the supplemental frame, a conveying mechanism carried by said supplemental frame, connections between the cutting and conveying mechanism and the rear wheels of the wagon, a drive shaft mounted in bearing of the supplemental frame and having gear connections with the first connections, a plate pivoted upon the driven shaft, a reel shaft journaled in the free end of said plate and provided with a reel, sprocket connections between the reel shaft and driven shaft, a lever and rod connection for oscillating said plate whereby the reel may be moved bodily forward and backward independently of the supplemental frame, said supplemental frame being vertically adjustable so as to move the reel vertically owing to the two moving vertically as one body, and a laterally extending conveyer adjustably independent of the main frame.

In testimony whereof I have signed my name to this specification in the presence of two subscribing witnesses.

PRICE FERGUSON.

Witnesses:
JOHN L. OLIVER,
T. A. CAMPBELL.